United States Patent [19]

Post et al.

[11] 3,792,496

[45] Feb. 12, 1974

[54] MEANS FOR MOUNTING A PEN DRIVE IN A CHART RECORDER OR THE LIKE

[75] Inventors: Melvin J. Post; Kenneth Lee Shelter, both of Rochester, N.Y.

[73] Assignee: Sybron Corporation, Rochester, N.Y.

[22] Filed: Apr. 11, 1973

[21] Appl. No.: 349,926

[52] U.S. Cl. .............................. 346/145, 346/139 R
[51] Int. Cl. .......................................... G01d 11/02
[58] Field of Search ........................ 346/145, 139 R

[56] References Cited
UNITED STATES PATENTS 3,281,090   10/1966   Baranowski.................... 346/136 X
3,401,403   9/1968   Staley ................................ 346/145

Primary Examiner—Joseph W. Hartary
Attorney, Agent, or Firm—Theodore B. Roessel; Roger Aceto

[57] ABSTRACT

Disclosed is a spring retaining plate for the pen drive of a chart recorder. The rod, which carries the sliding pen or scribe of the recorder, is held at one end in a blind hole in the base of the recorder. The other end of the rod is supported by a bracket, the end of the rod extending into an opening in the bracket. A spring retaining plate flush mounted to the bracket prevents the rod from sliding through the bracket opening. The retaining plate is pivoted to the bracket and also has an opening which aligns with the bracket opening when the plate is pivoted. In this way, the rod can be moved axially at least partly through the bracket opening to free the end of the rod held by the base. Providing a plurality of openings in the bracket and in the plate, permits relatively easy conversion of the recorder from a single to a double or triple pen drive.

7 Claims, 5 Drawing Figures

MEANS FOR MOUNTING A PEN DRIVE IN A CHART RECORDER OR THE LIKE

BACKGROUND OF THE INVENTION

The present invention relates generally to means for mounting a pen drive in a chart recorder and more particularly to mounting means which greatly facilitates the addition or removal of pen drives from the recorder.

Chart recorders are well known in the prior art. These recorders usually consist of a housing for holding the recording mechanism which, in its simplest configuration, includes a roll chart, a motor for driving the chart, a pen or other suitable scribe and a drive for moving the pen across the chart.

The pen is slidably mounted on a rod which extends in a direction transverse to the movement of the chart so that the pen may move across the chart. The pen drive then, simply slides the pen along this rod as the chart motor moves the chart paper beneath the pen.

One problem with the apparatus of the prior art is that it is difficult to replace pens or to convert, say a single pen recorder to a double or triple pen recorder or, conversely, to reduce the number of pens in the recorder. The present invention permits a change in the number of pens or replacement of any pen quickly and easily without unnecessarily complicating the structure supporting the pen or increasing the overall dimensions of the housing in which the recording apparatus is mounted.

SUMMARY OF THE INVENTION

The present invention may be characterized in one aspect, thereof, by the provision of a bracket member having an opening therein to receive one end of the pen support rod and a plate member flushed mounted to the bracket, the plate being pivoted to the bracket for movement in a plane parallel to the plane of the bracket, the plate having an opening therein which aligns with the bracket opening when the plate is pivoted from a recorder in-use to a recorder out-of-use position, the alignment of the bracket and plate openings allowing the rod to be moved at least partly through the bracket and plate openings to facilitate removal and/or replacement of the rod from the recorder.

OBJECTS OF THE INVENTION

One object of the present invention is to provide a chart recorder which can be quickly and easily converted in the field from a single pen drive recorder to a double or triple pen drive recorder.

Another object of the present invention is a chart recorder having a pen drive mounting means which greatly reduces the complexity of removing or replacing the pen drive.

A further object of the present invention is to provide, in a chart recorder, a mounting means which automatically locks the support rod of the pen drive in place when the cover of the recorder housing is closed.

These and other objects, advantages and characterizing features of the present invention will become more apparent upon consideration of the following detailed description thereof when taken in connection with the accompanying drawings depicting the same.

DESCRIPTION OF THE PREFERRED EMBODIMENTS

Figure 1:
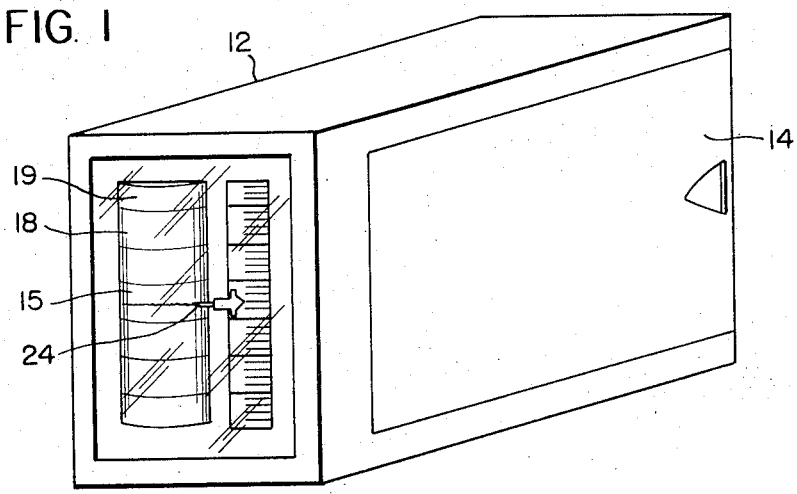
FIG. 1 is a prospective view showing a portion of the chart recorder.

Referring to the drawings, FIG. 1 shows a typical chart recorder well known in the art. The recorder is simply a housing 12 having, in this case, a sliding door 14 for access to the interior of the housing. The face 15 of the housing is of glass or other transparent material in order to be able to observe the plot drawn by a scribe or pen on chart paper 18 which is wound onto a driven wind-up roll 19.

Figure 2:
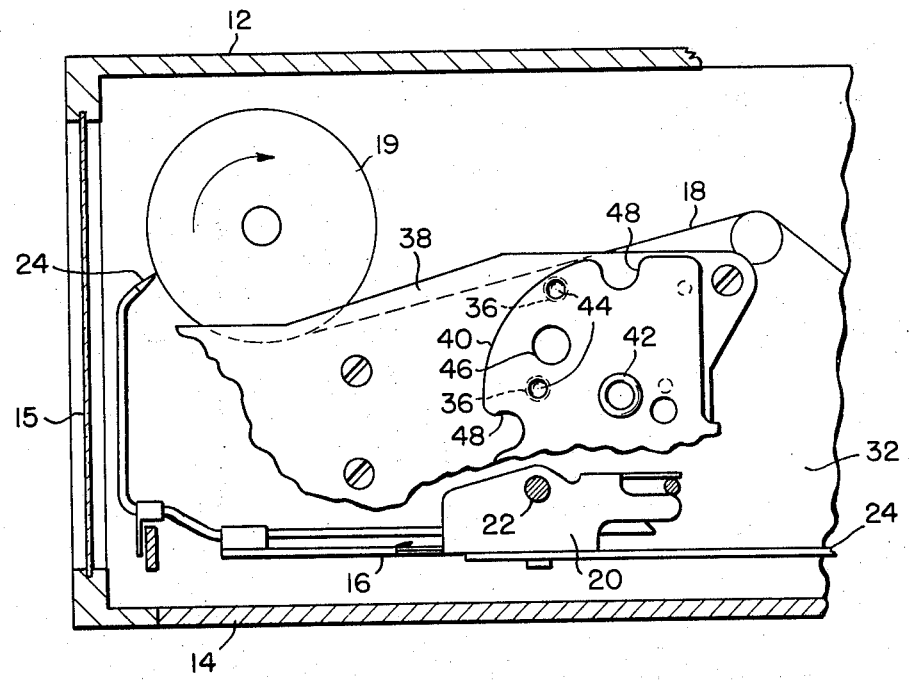
FIG. 2 is a plan view of the chart recorder partly broken away and in section.
Figure 3:
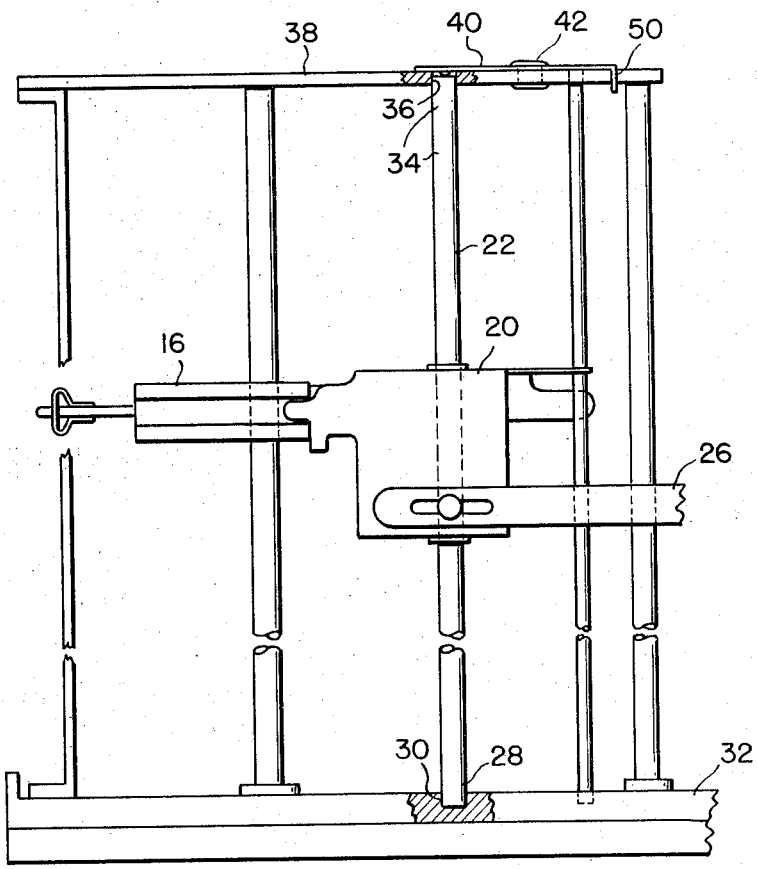
FIG. 3 is a foreshortened elevation view of the recorder with portions of the housing and other components omitted for clarity.

As shown in FIGS. 2 and 3, a scribe or pen assembly 16 is slidably mounted at one end 20 to an upright guide rod member 22. The other end of the pen assembly is provided with a nib 24 (FIG. 2) which transfers ink to the chart paper. Ink is delivered to the nib by any suitable means well known in the art.

End 20 of the pen assembly is driven slidably along rod 22 by a servo mechanism (not shown) in the recorder acting through a connecting arm 26. Such servo mechanisms are also well known in the art and need not be described in detail herein. In any event, with the pen being driven vertically along guide rod 22 as the chart paper 18 moves beneath the nib of the pen, an appropriate trace of pressure, temperature, or other process parameter is plotted on the chart paper.

Figure 5:
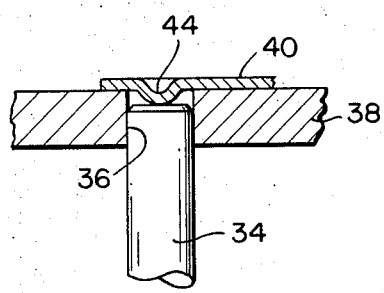
FIG. 5 is a sectional view showing on an enlarged scale a portion of FIG. 3.

As shown in FIG. 3, the lower end 28 of the guide rod is seated in a blind hole 30 formed in a base plate 32 of the recorder housing. The upper end 34 of the guide rod is held in an opening 36 extending through a top plate 38. In order to apply an axial force to rod 22 for purposes of firmly holding the guide rod in place, there is provided a spring plate member 40. Spring plate 40 is mounted flush with top plate 38 and is pivoted to the top plate at 42. As best seen in FIG. 5, plate 40 has a dimple portion 44 normally centered over opening 36 for purposes of axially bearing against rod 22. In this manner then, rod 22 is firmly held in position against both lateral and axially movement.

Figure 4:
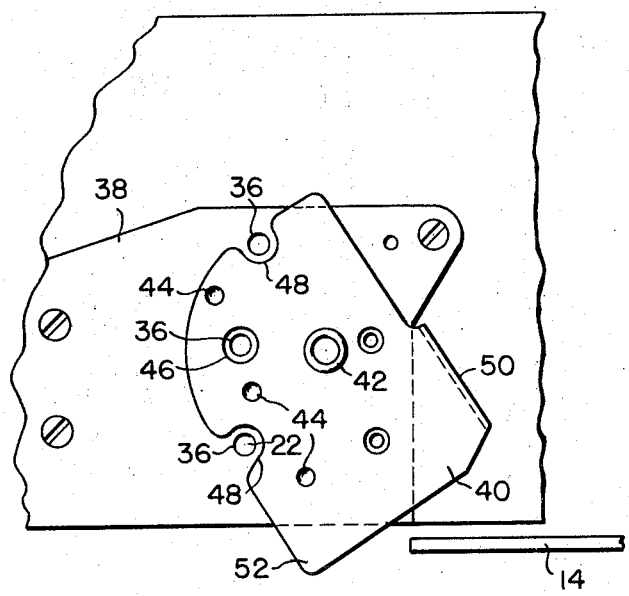
FIG. 4 is a plan view of a portion of the pen drive mechanism showing the spring retaining plate moved from the position shown in FIG. 2.

As shown in FIGS. 2 and 4, spring plate 40 has a plurality, preferably three, dimples 44 and top member 38 has an equal number of openings 36. When the spring plate and top plate are in the position shown in FIG. 2, the dimples in the spring plate align with the openings for purposes set out herein above, namely to bear against any rod 22 extending into the opening 36. In addition, spring plate 40 is provided with a pair of cut-outs 48 at its periphery and an opening 46. Opening 46 and cut-outs 48 are positioned with respect to journal 42 such that when the spring plate is rotated from the position shown in FIG. 2, to the position shown in FIG. 4, the openings 36 in the top plate are exposed for purposes set out herein below.

Often, when a customer purchases a single pen recorder, as shown in the drawings, he later desires to convert the recorder to a double or perhaps a triple pen drive. The present invention allows such a conversion to be made in the field quicker and easier than was heretofore possible with recorders of the prior art. In this respect, to convert the single pen drive instrument, shown in the figures to a multiple pen drive, sliding door 14 of housing 12 is first opened to allow excess to the interior of the recorder housing. A depending leg member 50 on spring plate 40 (FIGS. 3 and 4) is then manually engaged to pivot the spring plate counter clockwise from the position shown in FIG. 2 to the position shown in FIG. 4. This exposes all the openings 36 in top plate 38.

The new pen drives can now be installed simply by taking a new guide rod 22 together with its associated scribe assembly 16 and inserting the upper end 34 of new the rod into and through an opening 36. Once inserted through the opening the lower end 28 of the new guide rod may be located at its respective blind hole 30 which drops the upper end of the rod partly into an opening 36 as shown in FIGS. 3 and 5. The additional servo mechanisms (not shown) associated with the new pen drive can then be installed in the recorder and each new servo mechanism connected to its associated pen drive with a new linkage 26. In this manner pen drives may be added, removed, or replaced.

When the pen drives have all been set in place, spring plate member 40 is simply rotated back to the position shown in FIG. 2 to locate and seat dimples 44 in the openings 36 which in turn firmly lock the guide rods and pen assemblies in place.

As an added safety feature, the present invention permits an automatic locking of the guide rod in place in the event the operator should forget to do so before closing sliding door 14. In this respect, FIG. 4 shows that the counter clockwise rotation of spring plate 40 places a corner 52 of the plate in the path of travel of sliding door 14. Thus, when the sliding door is closed, it will first engage spring plate corner 52 and move the plate clockwise back to the position shown in FIG. 2 as it moves past the plate to a closed position.

Thus, it should be appreciated that the present invention accomplishes its intended objects in providing a recorder which can be quickly and easily converted in the field from a single pen drive recorder to a multiple pen drive recorder. The present invention also reduces the complexity of removing or replacing pen drives in the recorder and provides a novel mounting means which automatically locks the pen support rod in place when the access opening of the recorder is closed.

Having thus described the invention in detail what is claimed as new is:

1. Means for removably mounting a pen drive in the housing of a chart recorder or the like comprising:
    a. a bracket supported in said housing above a base of said housing, said bracket having a through opening;
    b. a guide rod supported at one end in said opening, the second end of said rod being releasably supported on said base;
    c. a pen drive assembly slidably mounted on said rod;
    d. a spring plate member mounted flush against and pivoted to said bracket for movement in a plate parallel to the plane of said bracket between a first and a second position;
    e. said spring plate having bearing means aligning with said through opening for bearing axially against said rod when said spring plate is in said first position to hold said rod against said base; and
    f. said spring plate having an opening which aligns with said through opening when said spring plate is in said second position, whereby said rod may be moved axially through said bracket and plate openings to release said rod from said base when said spring plate is in said second position.

2. Means for removably mounting a pen drive as a claim 1 wherein said base has a blind hole aligned with said bracket opening for releasably receiving said guide rod second end.

3. Means for reasonably mounting a pen drive as in claim 1 wherein said means on said spring plate is a dimple formed therein.

4. Means for removably mounting a pen drive as in claim 1 wherein said spring plate has a depending leg extending below said bracket for manually moving said plate from said first to said second position.

5. Means for removably mounting a pen drive as in claim 1 wherein said housing has a sliding door which permits excess to the interior of said housing and said spring plate has a portion which extends into the path of travel of said door when spring plate is in said second position, whereby closing said door causes it to engage and rotate said spring plate from said second to said first position.

6. Means for removably mounting a pen drive as in claim 1 wherein:
    a. said bracket has a plurality of spaced through openings each able to accommodate a guide rod;
    b. said spring plate having a corresponding number of said bearing means and openings whereby one bearing means extends into each bracket opening when said spring plate is in said first position and one spring plate opening aligns with each bracket opening when said spring plate is in said second position.

7. Means for removably mounting a pen drive as in claim 6 wherein at least one of said spring plate openings is formed by a cut-out section at the periphery of said plate.

* * * * *

PO-1050
(5/69)

UNITED STATES PATENT OFFICE
CERTIFICATE OF CORRECTION

Patent No. 3,792,496     Dated February 12, 1974

Inventor(s) Melvin J. Post and Kenneth Lee Shelter

It is certified that error appears in the above-identified patent and that said Letters Patent are hereby corrected as shown below:

Column 4, line 9, "plate" should be "plane".

Column 4, line 26, "reasonably" should be "releasably".

Column 4, line 37, after "when" insert -- said --.

Signed and Sealed this eighteenth Day of November 1975

[SEAL]

Attest:

RUTH C. MASON
Attesting Officer

C. MARSHALL DANN
Commissioner of Patents and Trademarks